United States Patent
Uttaro et al.

(10) Patent No.: US 10,785,142 B2
(45) Date of Patent: *Sep. 22, 2020

(54) INTER-PROVIDER NETWORK ARCHITECTURE

(71) Applicant: AT&T Intellectual Property I, L.P., Atlanta, GA (US)

(72) Inventors: James Uttaro, Staten Island, NY (US); Mark R. Sundt, Red Bank, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,486

(22) Filed: Jan. 29, 2019

(65) Prior Publication Data

US 2019/0158379 A1    May 23, 2019

Related U.S. Application Data

(63) Continuation of application No. 15/071,295, filed on Mar. 16, 2016, now Pat. No. 10,237,164, which is a (Continued)

(51) Int. Cl.
*H04L 12/715* (2013.01)
*H04L 12/721* (2013.01)
(Continued)

(52) U.S. Cl.
CPC ........ *H04L 45/04* (2013.01); *H04L 29/08171* (2013.01); *H04L 45/02* (2013.01); *H04L 45/12* (2013.01); *H04L 45/38* (2013.01); *H04L 47/125* (2013.01); *H04L 65/1069* (2013.01); *H04L 67/1008* (2013.01)

(58) Field of Classification Search
CPC ......... H04L 45/50; H04L 45/00; H04L 45/04; H04L 45/12
See application file for complete search history.

(56) References Cited

U.S. PATENT DOCUMENTS 7,636,324 B2    12/2009   Nassar
7,831,733 B2 *  11/2010   Sultan ................... H04L 45/04
                                              709/238
(Continued)

*Primary Examiner* — Sm A Rahman
*Assistant Examiner* — Chen-Liang Huang
(74) *Attorney, Agent, or Firm* — BakerHostetler

(57) ABSTRACT

An inter-provider network architecture system is disclosed. In particular, the system may enable a service provider network and a partner network to take advantage of each other's network cores, such that the resources of the service provider network and the partner network may be more effectively utilized to service customers of both networks. By doing so, not only can the service provider network and the partner network take advantage of each other's network resources, but they can also give each other's customers broader network reach into regions that are not typically serviced by their own networks. The service provider network may effectively accomplish this by providing a limited view of the service provider network to the partner network, or vice versa, so that traffic and data can flow between the networks without each network having to be fully aware of each other's entire network topologies.

20 Claims, 8 Drawing Sheets

Related U.S. Application Data continuation of application No. 13/705,453, filed on Dec. 5, 2012, now Pat. No. 9,325,561.

(51) Int. Cl.
  *H04L 12/751*   (2013.01)
  *H04L 29/08*    (2006.01)
  *H04L 12/803*   (2013.01)
  *H04L 29/06*    (2006.01)

(56) References Cited

U.S. PATENT DOCUMENTS

| | | |
|---|---|---|
| 8,169,903 B2 * | 5/2012 | Oz .................... H04L 12/4641 |
| | | 370/231 |
| 9,288,315 B2 | 3/2016 | Salonen |
| 10,237,164 B2 * | 3/2019 | Uttaro ............... H04L 29/08171 |
| 2003/0014665 A1 * | 1/2003 | Anderson ........... H04L 63/0227 |
| | | 726/4 |
| 2004/0246905 A1 | 12/2004 | Dunagan et al. |
| 2005/0089015 A1 | 4/2005 | Tsuge et al. |
| 2006/0041682 A1 | 2/2006 | Johnson et al. |
| 2006/0140136 A1 | 6/2006 | Filsfils et al. |
| 2006/0182122 A1 | 8/2006 | Davie et al. |
| 2006/0256724 A1 | 11/2006 | Martini et al. |
| 2007/0091796 A1 | 4/2007 | Filsfils et al. |
| 2009/0016361 A1 | 1/2009 | Serbest et al. |
| 2011/0149979 A1 | 6/2011 | Uttaro et al. |
| 2012/0224506 A1 * | 9/2012 | Gredler .................. H04L 45/04 |
| | | 370/254 |
| 2012/0278378 A1 | 11/2012 | Lehane et al. |
| 2013/0132542 A1 | 5/2013 | Zhang |

* cited by examiner

INTER-PROVIDER NETWORK ARCHITECTURE

CROSS-REFERENCE TO RELATED APPLICATIONS

This application is a Continuation of U.S. patent application Ser. No. 15/071,295, filed Mar. 16, 2016, which is a Continuation of and claims priority to U.S. patent application Ser. No. 13/705,453, filed Dec. 5, 2012, now U.S. Pat. No. 9,325,561. The contents of each of the foregoing is/are hereby incorporated by reference into this application in their entireties.

FIELD OF THE DISCLOSURE

The present application relates to network architecture technologies, and more particularly, to a system for providing an inter-provider network architecture.

BACKGROUND OF THE DISCLOSURE

In today's society, people and businesses regularly utilize network and other service providers to gain access to the Internet, place and receive telephone calls, access software services, receive and transmit various types of content, and perform a variety of other tasks and functions. The core networks of the service providers often assist in performing the above-identified services and functions. As an example, core networks often assist in supporting virtual private networks for various customers of the service provider. On occasion, however, the customer may want the customer's virtual private network to reach regions that are outside the service provider's network region. To meet this demand, such service providers often have to spend tremendous amounts of resources, time, and energy to build out and deploy the networks in order to provide such reach, functionality, and services to their customers. This holds particularly true when the network and service providers wish to expand into new geographical regions outside of their own geographical region, which may or may not include networks provided by competing or partner service providers.

Often times, service providers will handle and support services strictly for their own customers. When supporting such services for their customers, the resources of the core networks and other networks of the service provider may be overutilized or underutilized depending on the time of day, the amount of content the customers are trying to obtain, the amount of services the customers need to access, and a variety of other factors and conditions. Similarly, competing and partner service providers often experience the same overutilization and underutilization of their own core networks and other networks when they service their own customers. Building out networks to satisfy the various demands of customers, particularly when those demands require global reach and are unpredictable, may not be an optimal solution to satisfy customer demands, especially when considering the significant amount of resources required to do so.

SUMMARY

A system and accompanying methods for providing an inter-provider network architecture are disclosed. In particular, the system may enable a service provider network and a partner network to take advantage of each other's network cores, such that the resources of the service provider network and the partner network may be more effectively utilized to service customers of both networks. By doing so, not only can the service provider network and the partner network take advantage of each other's network resources, but they can also give each other's customers broader network reach into regions that are not typically serviced by their own networks. The service provider network may effectively accomplish this by providing a limited view of the service provider network to the partner network, or vice versa, so that traffic and data can flow between the networks without each network having to be fully aware of each other's entire network topologies. As a result, the service provider network and partner network can effectively utilize each other's resources to provide extended network reach for their customers without having to necessarily build out each of their individual networks. Furthermore, the network architecture can provide for a service agnostic method to approach optimal forwarding in support of multiple address families and can provide for a virtual private network or service with global reach.

In one embodiment, the inter-provider network architecture system may include a service provider core router in a service provider network that can perform various operations. The service provider core router can transmit an advertisement of a loopback of a service provider exchange point in the service provider network to a partner provider core router that is in communication with a partner provider edge router in a partner network. Additionally, the service provider core router can transmit a cost metric associated with reaching the service provider exchange point to the partner network. While the service provider core router is performing its functions or functioning otherwise, the service provider exchange point can receive an advertisement of a network prefix of a customer device in communication with a service provider edge router in the service provider network. The service provider exchange point may then transmit the advertisement of the network prefix for the customer device with a label to a partner provider exchange point in the partner network. The label may identify the service provider exchange point as a next hop. Then, the advertisement of the network prefix may be transmitted by the system to the partner provider edge router in the partner network. The service provider exchange point may receive traffic intended for the customer device if the cost metric indicates that the service provider exchange point is in a shortest path from the partner provider edge router in the partner network. The traffic may be received based in part on the advertisement of the loopback and the advertisement of the network prefix with the label.

In another embodiment, a method for providing an inter-provider network architecture is disclosed. The method may include receiving, at a service provider exchange point in a service provider network, an advertisement of a network prefix of a customer device in communication with a service provider edge router in the service provider network. Additionally, the method may include transmitting the advertisement of the network prefix for the customer device with a label to a partner provider exchange point in a partner network. The label may identify the service provider exchange point as a next hop. The advertisement of the network prefix may be transmitted to a partner provider edge router in the partner network. Furthermore, the method may include receiving traffic intended for the customer device if a cost metric indicates that the service provider exchange point is in a shortest path from the partner provider edge router in the partner network. The traffic may be received based in part on an advertisement of a loopback of the service provider exchange point in the service provider network and the advertisement of the network prefix with the label.

According to another exemplary embodiment, a computer-readable medium having instructions for providing an inter-provider network architecture is provided. The computer instructions, which when loaded and executed by a processor, may cause the processor to perform operations including: receiving an advertisement of a network prefix of a customer device in communication with a service provider edge router in a service provider network; transmitting the advertisement of the network prefix for the customer device with a label to a partner provider exchange point in a partner network, wherein the label identifies a service provider exchange point in the service provider network as a next hop; and receiving traffic intended for the customer device if a cost metric indicates that the service provider exchange point in the service provider network is in a shortest path from a partner provider edge router in the partner network, wherein the traffic is received based in part on an advertisement of a loopback of the service provider exchange point and the advertisement of the network prefix with the label.

These and other features of the inter-provider network architecture systems and methods are described in the following detailed description, drawings, and appended claims.

DETAILED DESCRIPTION OF THE DRAWINGS

Figure 1:
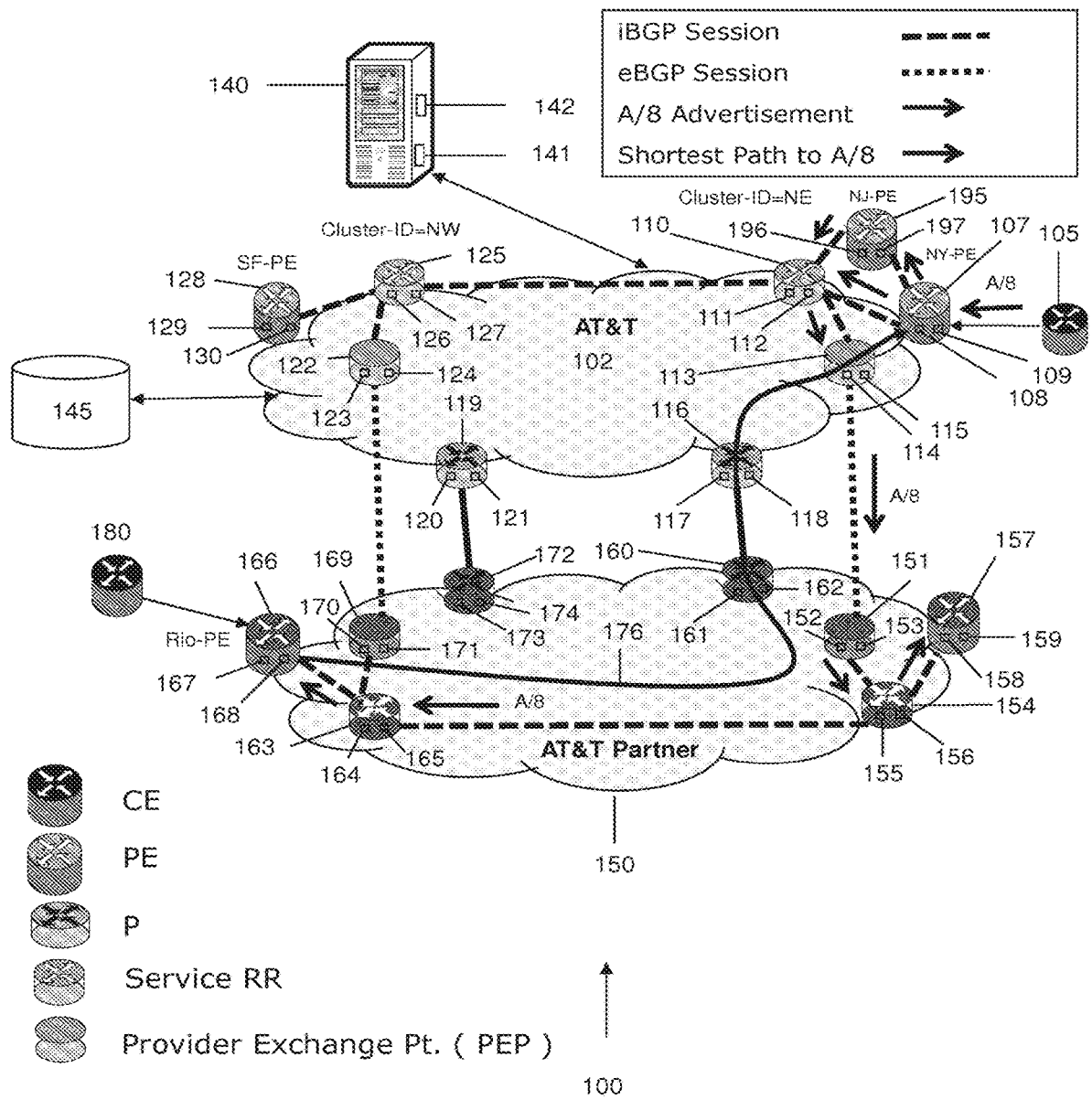
FIG. 1 is a schematic diagram of a system for providing an inter-provider network architecture according to an embodiment of the present disclosure.

A system 100 and accompanying methods for providing an inter-provider network architecture are disclosed. The system 100 may enable a service provider network 102 and a partner network 150 to take advantage of each other's network cores, such that the resources of the service provider network 102 and the partner network 150 may be more effectively utilized to service customers of both networks 102 and 150. By doing so, not only can the service provider network 102 and the partner network 150 take advantage of each other's network resources, but they can also give each other's customers broader network reach into regions that are not typically serviced by their own networks 102, 150. The service provider network 102 may provide a limited view of the service provider network 102 to the partner network 150, or vice versa, so that traffic and data can flow between the networks without each network having to be fully aware of each other's entire network topologies. As a result, the service provider network 102 and partner network 150 can effectively utilize each other's resources to provide extended network reach for their customers without having to necessarily build out each of their individual networks 102, 150. Furthermore, the network architecture can provide for a service agnostic method to approach optimal forwarding in support of multiple address families and can provide for a virtual private network or service with global reach.

The system 100 may be configured to support, but is not limited to supporting, content delivery services, cloud computing services, business voice-over-internet protocol services (BVoIP), and other network services. Additionally, the system 100 may be service agnostic and may be configured to support virtual private networks (VPNs), virtual private LAN service (VPLS), and other related technologies. Referring to the drawings and in particular to FIGS. 1-4, the system 100 may enable the service provider network 102 and the partner network 150 to share a portion of each other's network resources such that each network can assist each other in providing network services to each other's customers. Illustratively, the service provider network 102 is shown as being located in the United States and the partner network 150 is shown as being located in South America, however, the networks may be physically located in any desired regions. In one embodiment, the partner network 150 may be defined as a network that is located in a different geographic region than the service provider network 102, and is also controlled by a company that is different than the company controlling the service provider network 102. The service provider network 102 and the partner network 150 can include, but are not limited to including, a wireless network, an ethernet network, a satellite network, a broadband network, a cellular network, a private network, a cable network, the Internet, an internet protocol network, a multiprotocol label switching (MPLS) network, or any combination thereof. In one embodiment, the service provider network 102 may be part of a first autonomous system in one region and the partner network 150 may be part of a second autonomous system in a different region. Notably, the system 100 may utilize a combination of software and hardware to perform the operative functions and services of the system 100 disclosed herein.

Figure 2:
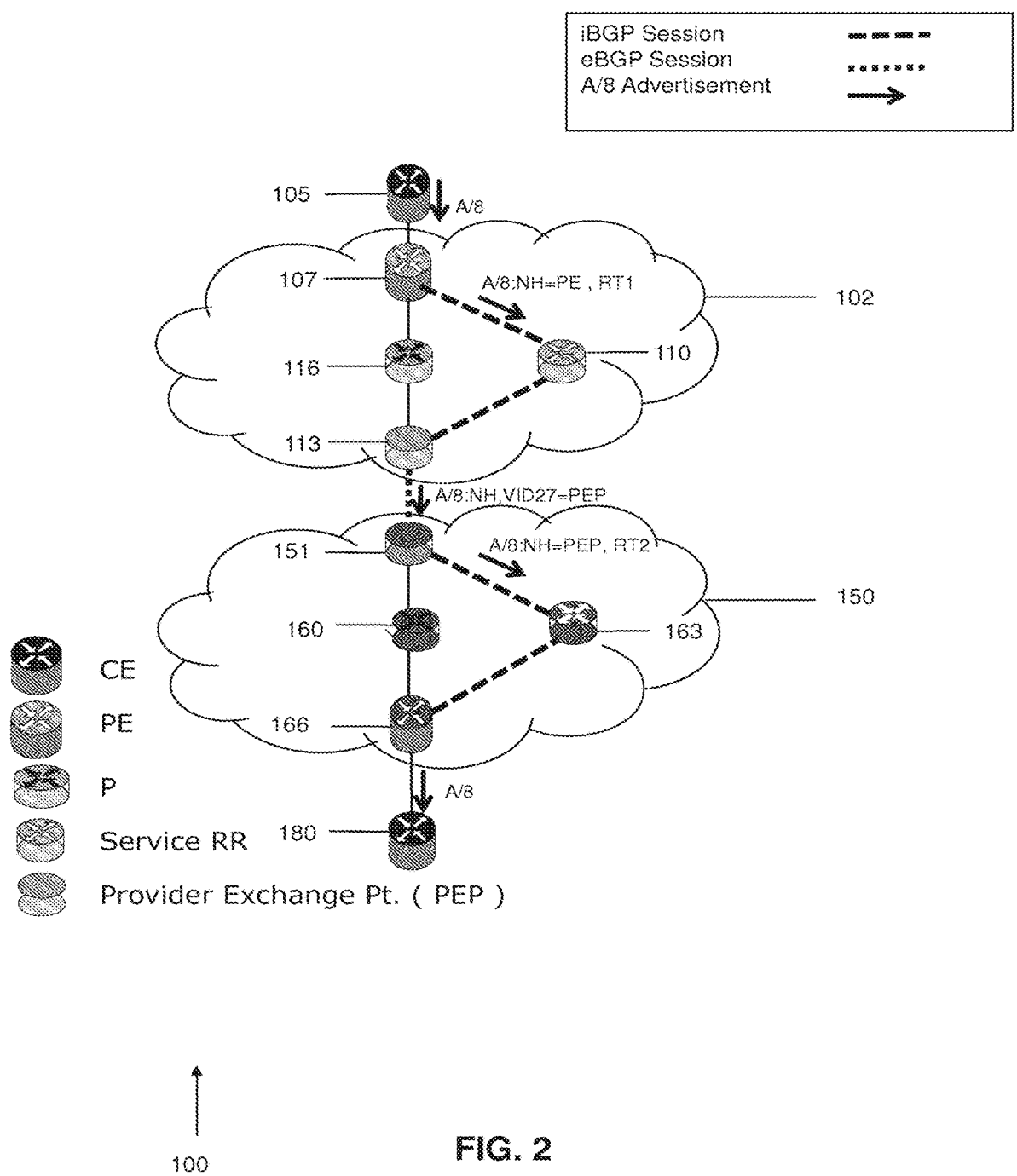
FIG. 2 is a schematic diagram of a portion of the system of FIG. 1, which illustrates the advertisement of a network prefix of a customer from a service provider network to a partner network.
Figure 3:
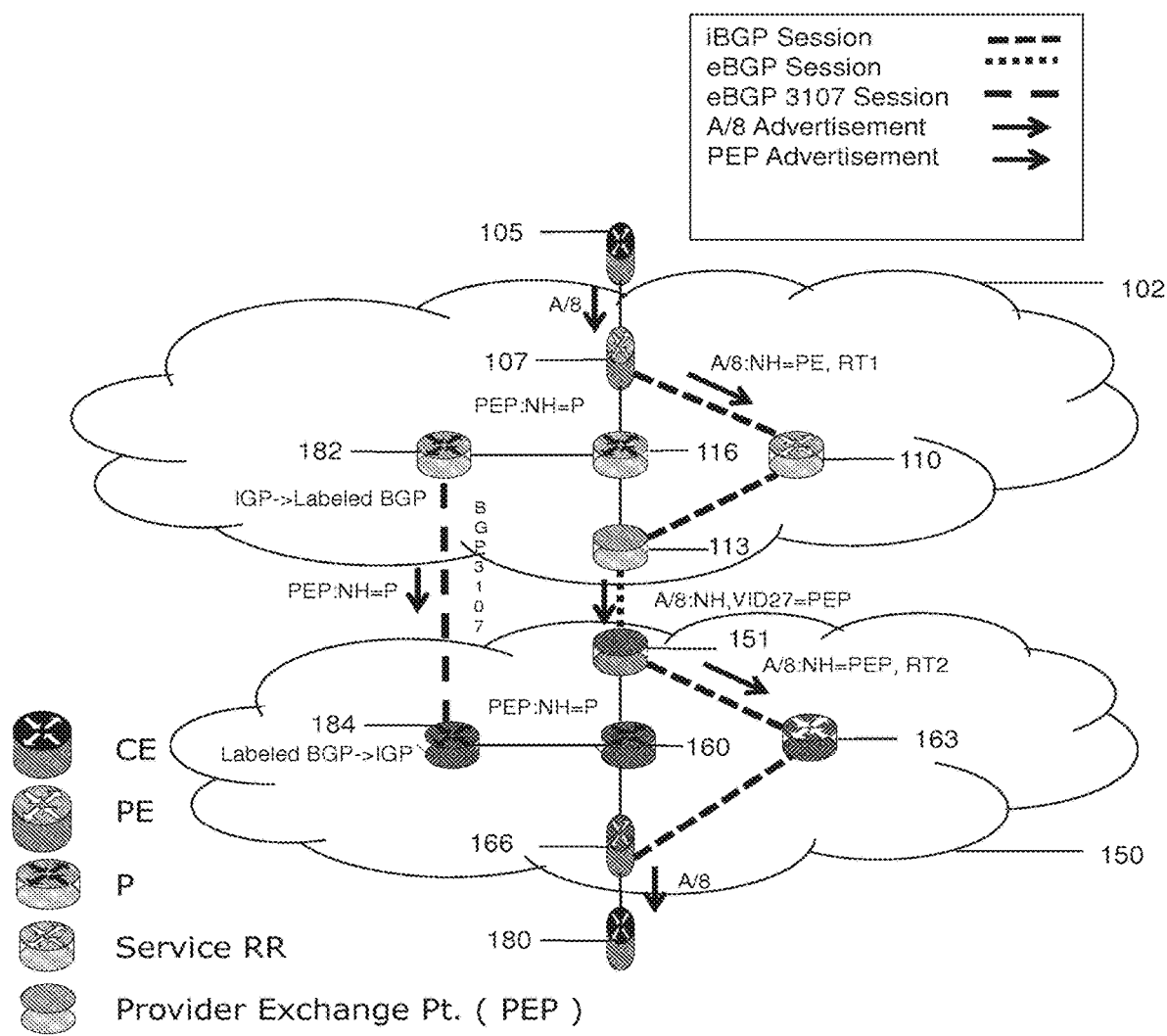
FIG. 3 is a schematic diagram of a portion of the system of FIG. 1, which illustrates the advertisement of the network prefix of a customer and the advertisement of a service provider exchange point in the service provider network to the provider network.

Operatively, the system 100, as shown in FIGS. 1-3, may be configured to establish a first interconnect point between the service provider network 102 and the partner network 150. In doing so, the system 100 may be configured to have a customer, that has a network prefix, transmit a request for a particular set of data or content. In FIGS. 1-4, the network prefix is shown as "A/8," however, any suitable network prefix may be usable to identify the customer. The customer's customer edge device 105 can relay this request to the service provider network 102 for processing and handling via the service provider edge router (PE) 107, which in this case may be a New York PE ("NY-PE") located in the northeast region (NE) of the United States. In one embodiment, the service provider network 102 can establish a secure VPN connection for the customer so that the customer can securely obtain the data or content by utilizing the VPN. The system 100 may be utilized to connect the VPN together in such a way that the VPN is defined using different route targets that are on the service provider network 102 and the partner network 150, such as shown in FIGS. 2 and 3. Additionally, the service PE 107, the route reflector 110, and the service provider exchange point (PEP) 113 located in the NE region, and the service PE 128 (San Francisco PE ("SF-PE")), the route reflector 125, and the service PEP 122 in the northwest (NW) region can establish interior border gateway protocol (iBGP) sessions or other suitable sessions to communicate with each other. At this point or at any other designated time, the service PE 107 can advertise the network prefix of the customer to route reflector 110 with a label that indicates that the next hop is equal to the service PE 107. The service PE 107 may advertise the network prefix by using a processor 108 to execute instructions, which may be stored in memory 109, and which may cause the processor 108 to advertise the network prefix. Notably, the processor 108 may perform any of the operative functions of the service PE 107 and may be comprised of software, hardware, or a combination thereof. In one embodiment, the service PE 107 may serve as the interface device between the service provider network 102 and the customer edge device 105.

Once the route reflector 110 receives the advertisement of the network prefix of the customer, the route reflector 110 may advertise the network prefix to the service PEP 113. In one embodiment, the route reflector 110 may advertise the network prefix by having processor 111 execute instructions stored in memory 112. The processor 111 may perform any of the operative functions of the route reflector 110 and may have similar functionality as compared to the other processors disclosed herein. In one embodiment, the route reflector 110 may serve as an iBGP peer to the service PE 107 and the service PEP 113. Once the advertisement of the network prefix is received by the service PEP 113, the service PEP 113 can advertise the network prefix to the partner PEP 151 of the partner network 150 with a label indicating that the next hop is equal to the service PEP 113. This may be performed by utilizing an external BGP (eBGP) session or other suitable session between the service PEP 113 and the partner PEP 151. In one embodiment, the processor 114 of the service PEP 113 can execute instructions stored in memory 115 to advertise the network prefix. Much like the devices in the service network 102, the partner PEP 151, the route reflector 154, the partner PE 157, the route reflector 163, the partner PEP 169, and the partner PE 166, can establish an iBGP session or other suitable session to communicate with one another. The partner PEP 151 may advertise the network prefix to the route reflector 154 by utilizing the processor 152 and memory 153. Then, the route reflector 154 may utilize processor 155 and memory 156 to advertise the network prefix of the customer to the partner PE 157, which may have its own processor 158 and memory 159 for performing operations in the system 100. Additionally, the route reflector 154 may also advertise the network prefix to the other route reflector 163 in the partner network 150.

At this point, the route reflector 163 may utilize processor 164 and memory 165 to advertise the network prefix of the customer to partner PE 166, which may be located in Rio de Janeiro, Brazil, which is located in the South America region. The partner PE 166, which may also be known as the "Rio-PE," may be the router that has access to the data or information that the customer is attempting to obtain and may include its own processor 167 and memory 168. The partner PE 166 may further advertise the network prefix to partner customer device 180, as shown in FIGS. 2 and 3. Once the advertisement of the network prefix has traversed the various devices as described herein, the devices in the partner network 150 can determine information, such as location and routing information, associated with the customer, the service PEP 113, and the service network 102 based on both the advertisement of the prefix and the label indicating that the next hop is equal to the service PEP 113. Additionally, the partner network 150 may utilize this information to assist in determining a path, such as a shortest path, to the service PEP 113 via the partner provider core routers 160 and 172 and the service provider core routers 119 and 116.

In addition to advertising the network prefix of the customer to the partner network 150 to establish the first interconnect point between the service provider network 102 and the partner network 150, the system 100 may establish a second interconnect point between the service provider network 102 and the partner network 150, as shown in FIG. 3. In one embodiment, the second interconnect point may be established prior to the first interconnect point. As shown in FIG. 3, the second interconnect point may be established by having the service provider network 102 advertise a loopback of the service PEP 113, or any other chosen service PEP, to the partner network 150. In one embodiment, the loopback may be a network address of the service PEP 113 or any other identifier for the service PEP 113. The advertisement of the loopback of the service PEP 113 may be utilized to convey reachability information for reaching the service PEP 113. The service provider core router 116 may advertise the loopback of the service PEP 113 to the service provider core router 182 with a label indicating that the next hop is the service provider core router 116. The service provider core router 116 may do so by utilizing processor 117 and memory 118. The service provider core router 182 may then advertise the loopback of the service PEP 113 with the same label to the partner provider core router 184, which further advertises the loopback of the service PEP 113 with the label to the partner provider core router 160 in the partner network 150. In one embodiment, the loopback of the service PEP 113 may be advertised between the service provider core routers 116 and 182 and the partner provider core routers 184 and 160 by utilizing a labeled BGP session. In one embodiment, the provider core routers 116, 182, 184 and 160, or any other provider core routers in the system 100, can communicate via an eBGP 3107 session. The loopback of the service PEP 113 may be further advertised to the other devices (e.g. partner PE 166) in the partner network 150 as well.

Along with the advertisement of the loopback of the service PEP 113, a cost metric associated with reaching the service PEP 113 may also be conveyed to the partner network 150 via the BGP session. The cost metric may be conveyed by utilizing the accumulated IGP (AIGP) metric attribute between the service provider core routers 116, 182, or any other service provider core routers, and the partner provider core routers 184, 160, or any other partner provider core routers. Each of the service provider core routers 116, 182 and the partner provider core routers 184, 160 can inform each other of their own cost metrics such that the partner network 150 can utilize this information to determine a shortest path 176, as shown in FIG. 1, to the service PEP 113 via the partner provider core routers 184, 160 and the service provider core routers 116, 182, or any other routers that may be in the path. In one embodiment, the partner PE 166 of the partner network 150 can determine the shortest path 176 to get to the service PEP 113 based on the AIGP metric attributes for the service provider core routers 116, 182 and the partner provider core routers 184, 160, even though the partner PE 166 and the service PEP 113 are located in different networks. In one embodiment, the cost metrics may be aligned between the service provider network 102 and the partner network 150. For example, if the cost metrics from the service provider core routers 116, 182 are associated with latency, then the cost metrics from the partner provider core routers 184, 160 should also be associated with latency. However, if the cost metrics from the service provider core routers 116, 182 are associated with latency, and the cost metrics from the partner provider core routers 184, 160 are associated with bandwidth, then it may be difficult for the partner network 150 to determine the shortest path in a meaningful and useful manner.

Figure 4:
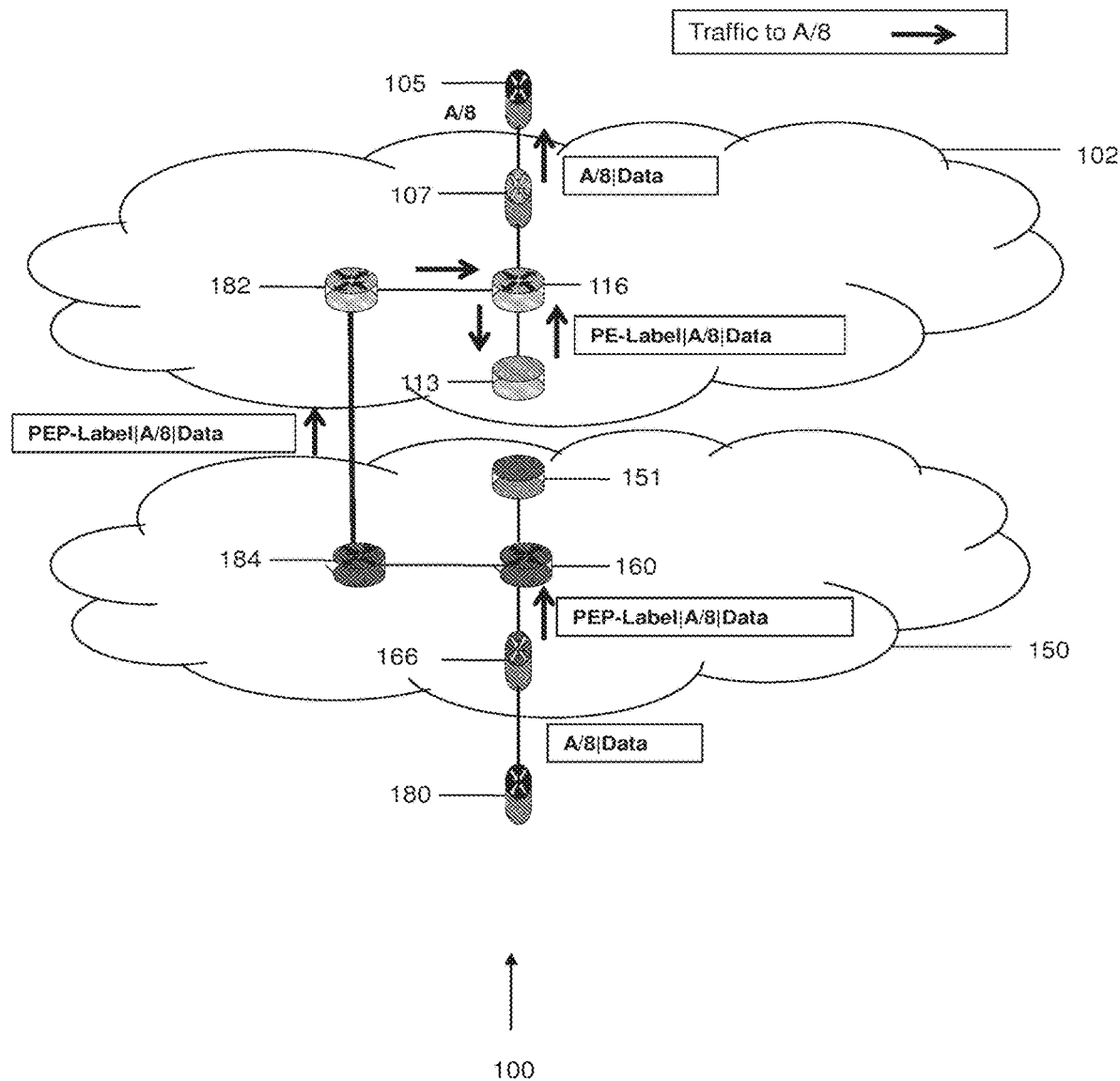
FIG. 4 is a schematic diagram of the traffic flow from the partner network to the service provider network once the advertisement of the service provider exchange point in the service provider network and the advertisement of the network prefix of the customer are processed by the partner network.

Once the first interconnection point is established based on the advertisement of the network prefix with the label identifying the service PEP 113 as the next hop, and the second interconnection point is established based on the advertisement of the service PEP 113 with the label identifying the provider core router 116 as the next hop, the partner network 150 can begin to transmit the traffic intended for the customer as shown in FIGS. 1 and 4. The traffic may be associated with the request that the customer initially sent to the service provider network 102. In this particular scenario, the partner network 102, such as via partner PE 166, has determined that the shortest path 176 from partner PE 166 to service PEP 113 is through partner provider core router 160, partner provider core router 184, service provider core router 182, and the service provider core router 116. In order to transmit the traffic to the customer, the provide PE 166 can initially transmit the traffic to the partner provider core router 160 with a label or label stack identifying the service PEP 113 so that the traffic may be directed to the service PEP 113. The partner provider core router 160 can forward the traffic to the partner provider core router 184 with the same label identifying the service PEP 113, and the partner provider core router 184 can also transmit the traffic to the service provider core router 182 with the same label identifying the service PEP 113.

Once the service provider core router 182 receives the traffic from the partner provider core router 184, the service provider core router 182 can transmit the traffic to the service provider core router 116 with the label identifying the service PEP 113. Then, the service provider core router 116 may forward the traffic to the service PEP 113 with the label identifying the service PEP 113. At this point, however, the service PEP can evaluate the label identifying the service PEP 113 and then forward the traffic to the PE 107 with a label that identifies the PE 107 as the intended target for the traffic. Once the PE 107 receives the traffic, the PE 107 can pop off or otherwise remove the label and transmit the traffic to the customer edge device 105. The customer edge 105 device may then forward the traffic directly to the customer that has the network prefix A/8.

Figure 5:
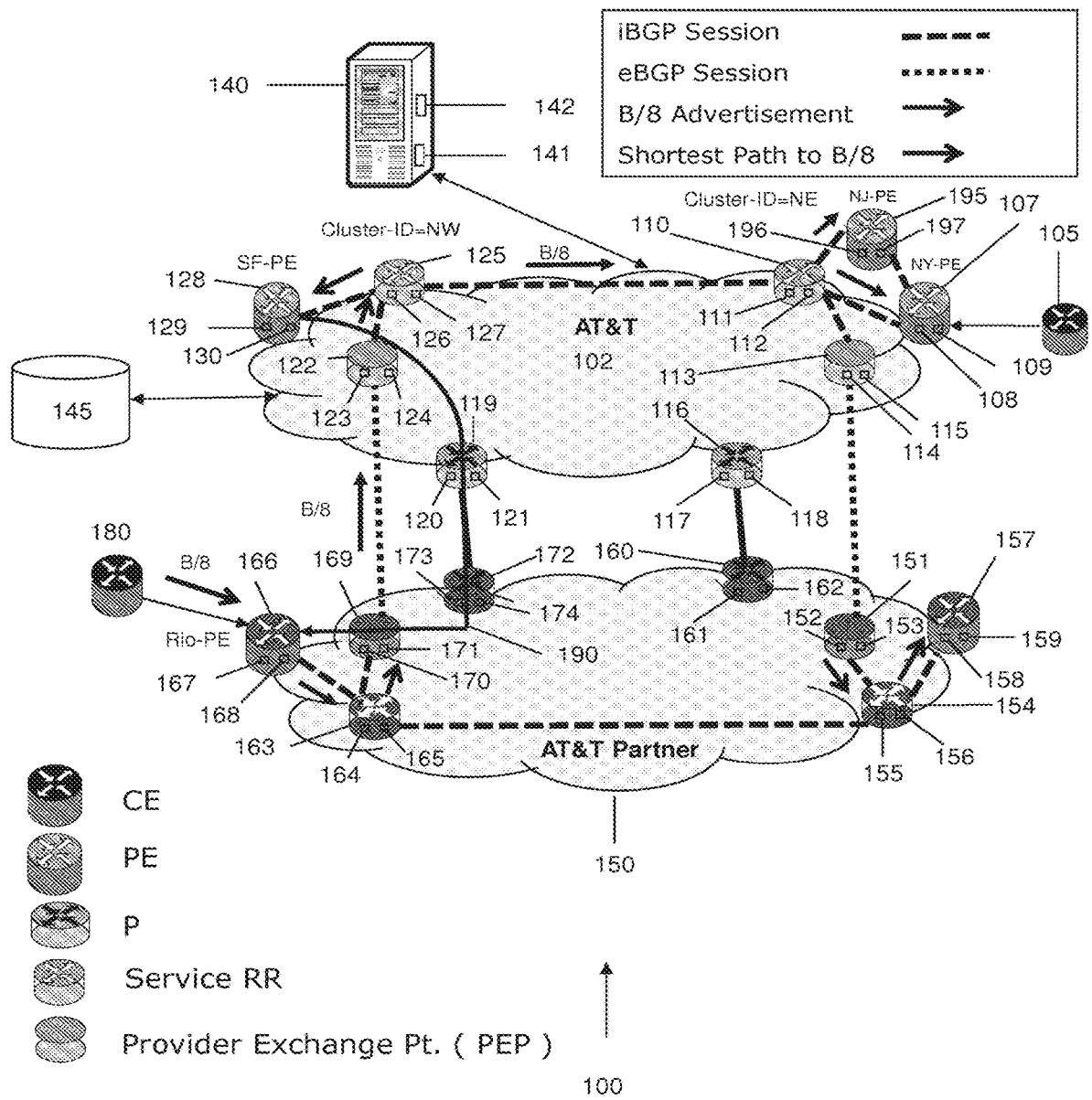
FIG. 5 is a schematic diagram of the system of FIG. 1, which shows a scenario where the traffic flows from the service provider network to the partner network for a customer requesting the traffic in the partner network.

In one embodiment, the process of establishing the first and second connection points described herein may also be done from the perspective of the partner network 150 as well. For example, if a customer from the partner network 150 wants to access content or data that resides in the NW region of the service provider network 102, the customer can transmit a request for content or data to the partner network 150. The customer edge device 180, as shown in FIG. 5, can forward the request to the PE 166, and the PE may advertise the network prefix B/8 of the customer to the route reflector 163, which may advertise the network prefix to the partner PEP 169 by utilizing processor 164 and memory 165. The partner PEP 169 may advertise the network prefix B/8 to the service PEP 122 with a label that identifies that partner PEP 169 as a next hop. The partner PEP 169 may advertise the network prefix B/8 by utilizing processor 170 and memory 171. Once the service PEP 122 receives the advertisement, the service PEP 122 may advertise the network prefix B/8 with the label that identifies the partner PEP 169 to the route reflector 125 by utilizing processor 123 and memory 124. The route reflector 125 may advertise the network prefix B/8 of the customer of the partner network 150 to the service PE 128 (SF-PE) by utilizing processor 126 and memory 127. The service PE 128 may determine information associated with the partner network 150 and the partner PEP 169 based on the advertisement and the label, and also advertise the network prefix to a customer that the service PE 128 services. The service PE may advertise the network prefix by utilizing the processor 129 and the memory 130. As a result, the first connection point may be established with the service provider network 102.

In addition to advertising the network prefix of the customer to the service provider network 102 to establish the first interconnect point between the partner network 150 and the service provider network 102, the system 100 may establish a second interconnect point between the partner network 150 and the service provide network 102. The second interconnect point may be established by having the partner network 150 advertise a loopback of the partner PEP 169 (or any other chosen partner PEP) to the service provider network 102. In one embodiment, the loopback may be a network address of the partner PEP 169 or any other identifier for the partner PEP 169. The advertisement of the loopback of the partner PEP 169 may convey reachability information for reaching the partner PEP 169. The partner provider core router 172 may advertise the loopback of the partner PEP 169 to the service provider core router 119 with a label indicating that the next hop is the partner provider core router 172. The partner provider core router 172 may advertise the loopback by utilizing processor 173 and memory 174. The service provider core router 119 may then advertise the loopback of the partner PEP 169 with the same label to other devices (e.g. service PE 128) in the service provider network 102 by utilizing processor 120 and memory 121. In one embodiment, the loopback of the partner PEP 169 may be advertised between the partner provider core router 172 and the service provider core router 119 by utilizing a labeled BGP session. In one embodiment, the provider core routers 172 and 119 can communicate via an eBGP 3107 session.

In addition to the advertisement of the loopback of the partner PEP 169, a cost metric associated with reaching the partner PEP 169 may also be conveyed to the service provider network 102 via a BGP session or other similar session. As disclosed herein, the cost metric may be conveyed by utilizing the AIGP metric attribute between the partner provider core router 172 and the service provider core router 119. The partner provider core router 172 and the service provider core router 119 can utilize this information to determine a shortest path to the partner PEP 169 via the service provider core router 119 and the partner provider core router 172 (or any other routers that may be in the path).

In one embodiment, the service PE 128 can determine the shortest path to get to the partner PEP 169 based on the AIGP metric attributes for the partner provider core router 172 and the service provider core router 119.

Once the first interconnection point is established based on the advertisement of the network prefix with the label identifying the partner PEP 169 as the next hop, and the second interconnection point is established based on the advertisement of the partner PEP 169 with the label identifying the partner provider core router 172 as the next hop, the service network 102 can begin to transmit traffic intended for the customer of the partner network 150. In this scenario, the service network 102 (such as via service PE 128) may determine that the shortest path 190 from service PE 128 to the partner PEP 169 is through the service provider core router 119 and the partner provider core router 172, as shown in FIG. 5. In order to transmit the traffic to the customer, the service PE 128 can transmit the traffic to the service provider core router 119 with a label identifying the partner PEP 169 so that the traffic may be directed to the partner PEP 169. The service provider core router 119 may then forward the traffic to the partner provider core router 172 with the same label identifying the partner PEP 169.

When the partner provider core router 172 receives the traffic from the service provider core router 119, the partner provider core router 172 can transmit the traffic to the partner PEP 169 with the label identifying the partner PEP 169. The partner PEP 169 can evaluate the label identifying the partner PEP 169 and then forward the traffic to partner PE 166 with a label that identifies the partner PE 166 as the intended target for the traffic. Once the partner PE 166 receives the traffic, the partner PE 166 can remove the label and transmit the traffic to the customer edge device 180, as shown in FIG. 5. The customer edge device 180 may then forward the traffic directly to the customer that sent the initial request. As a result, a seamless network definition may be provided between the service provider network 102 and the partner provider network 150 such that each network may take advantage of each other's core routing resources to service the needs of each other's customers.

Notably, the system 100 may perform any of the operative functions disclosed herein by utilizing the processing capabilities of server 140, the storage capacity of the database 145, or any other component of the system 100 to perform the operative functions disclosed herein. The server 140 may include one or more processors 141 that may be configured to process any of the various functions of the system 100. The processors 141 may be software, hardware, or a combination of hardware and software. Additionally, the server 140 may also include a memory 142, which store instructions that the processors 141 may execute to perform various operations of the system 100. For example, the server 150 may assist in processing loads handled by the various device in the system 100, such as, but not limited to, advertising the network prefix and service provider exchange point 113, calculating the shortest path between various devices in the system 100, and any other suitable operations conducted in the system 100 or otherwise. In one embodiment, multiple servers 140 may be utilized to process the functions of the system 100. The server 140 and other devices in the system 100, may utilize the database 145 for storing data about the devices in the system 100, data about the shortest paths between devices in the system, routing information, the network prefix, the advertisements, or any other information that is associated with the system 100. In one embodiment, multiple databases 145 may be utilized to store data in the system 100.

Although FIGS. 1-5 illustrate specific example configurations of the various components of the system 100, the system 100 may include any configuration of the components, which may include using a greater or lesser number of the components. For example, the system 100 is illustratively shown as including a customer edge device 105, service PEs 107 and 128, service PEPs 113 and 122, service provider core routers 116 and 119, partner PEPs 151 and 169, server 140, database 145, along with other devices. However, the system 100 may include multiple customer edge devices 105, multiple servers 140, multiple databases 145, or any number of any of the other components in the system 100. Furthermore, in one embodiment, substantial portions of the functionality of the system 100 may be performed by service PEP 113 and the service provider core router 116 without need for the server 140, the database 145, or any combination thereof.

Figure 6:
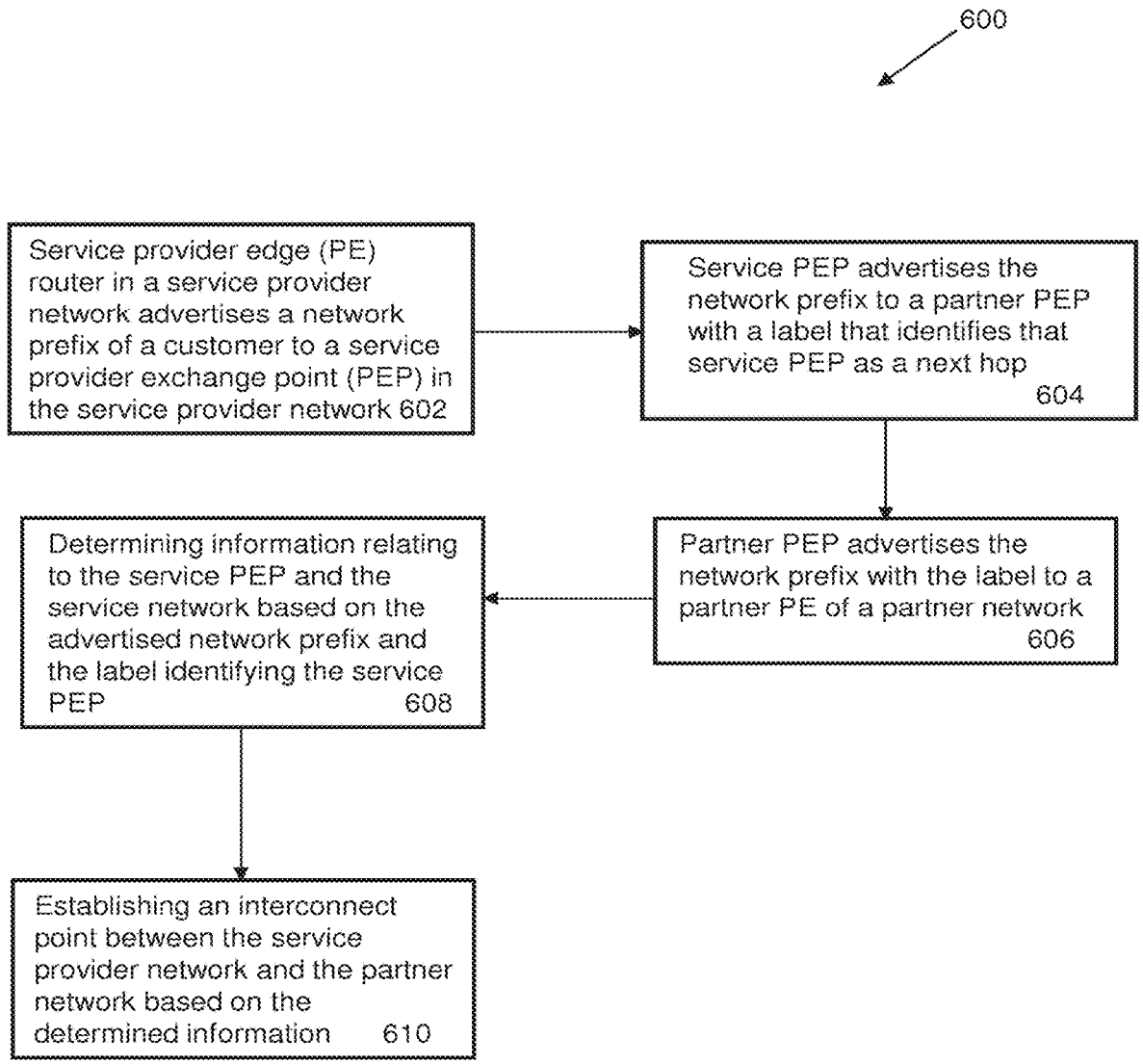
FIG. 6 is a flow diagram illustrating a sample method for establishing a first interconnect point for providing an inter-provider network architecture.

As shown in FIG. 6, an exemplary method 600 for establishing a first interconnection point in an inter-provider network architecture system 100 is schematically illustrated. The method 600 may include, at step 602, having a service PE 107 in a service provider network 102 advertise a network prefix of a customer to a service PEP 113 in the service provider network 102. In one embodiment, advertisement may be performed by the service PE 107 with the assistance of the server 140, database 145, any combination thereof, or other appropriate device. At step 604, the method 600 may include having the service PEP 113 advertise the network prefix of the customer to a partner PEP 151 in a partner network 150. In one embodiment, the advertisement of the network prefix may include a label that identifies the service PEP 113 as a next hop. At step 606, the method 600 may include having the partner PEP 151 advertise the network prefix and label to a partner PE 166 of the partner network 150. The partner network 150, such as via partner PE 166, may determine information relating to the service PEP 113 based on the advertised network prefix of the customer and the label identifying the service PEP 113 as the next hop at step 608. At step 610, the method 600 may include establishing an interconnect point between the service provider network 102 and the partner network 150 based on the determined information.

Figure 7:
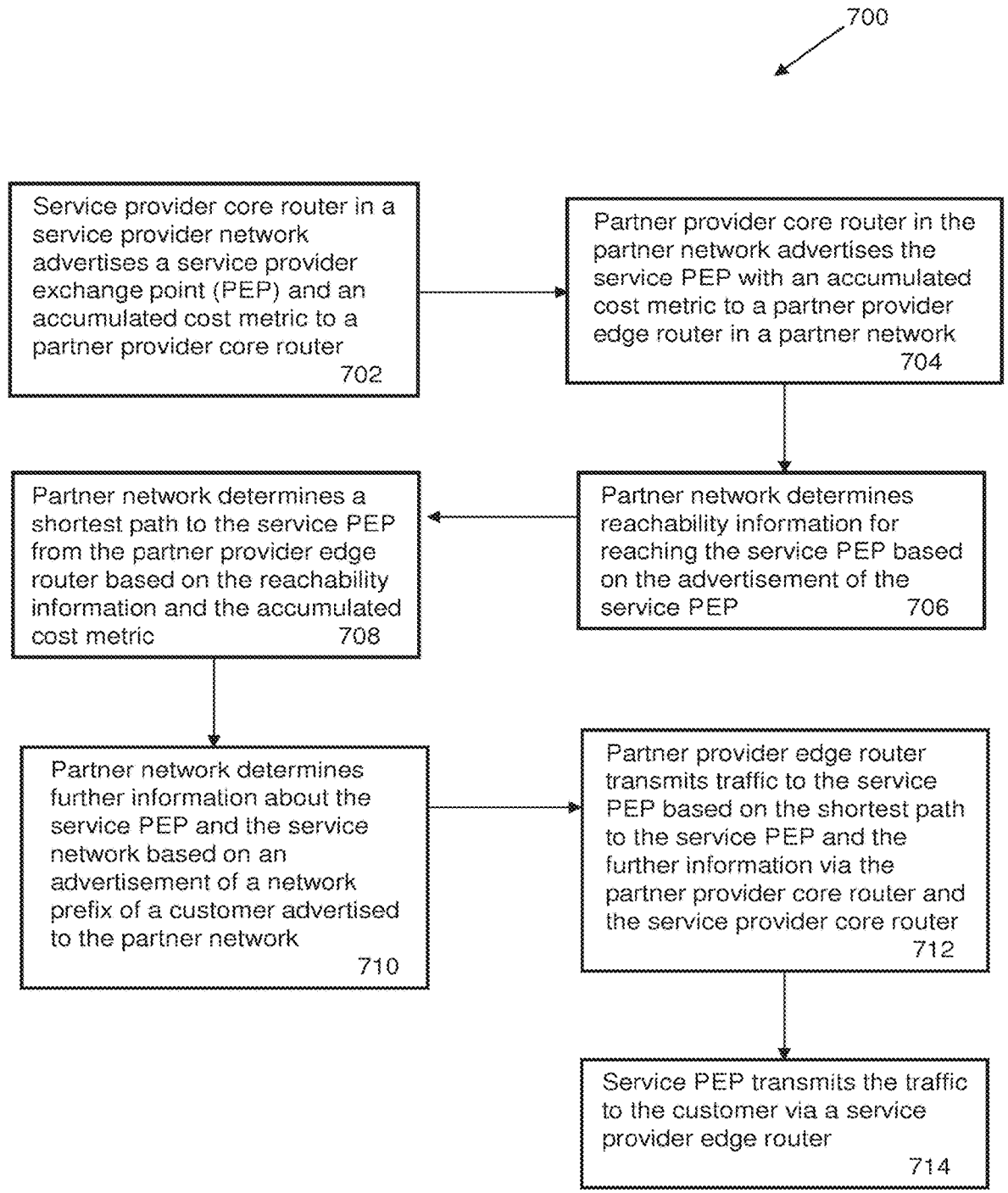
FIG. 7 is a flow diagram illustrating a sample method for establishing a second interconnect point for providing an inter-provider network architecture.

As shown in FIG. 7, an exemplary method 700 for establishing a second interconnection point and initiating traffic flow in an inter-provider network architecture system 100 is schematically illustrated. The method 700 may include, at step 702, having a service provider core router 116 in a service provider network 102 advertise a service PEP 113 and an AIGP cost metric associated with reaching the service PEP 113 to a partner provider core router 160. At step 704, the method 700 may include having the partner provider core router 160 in the partner network 150 advertise the service PEP 113 with the AIGP cost metric to a partner PE 166 in the partner network 150. At step 706, the method 700 may include having the partner network 150 determine reachability information for reaching the service PEP 113 based on the advertisement of the service PEP 113. The partner network 150 may determine the reachability information by utilizing the partner PE 166, for example.

The method 700 may include having the partner determine a shortest path to the service PEP 113 from the partner PE 166 based on the determined reachability information and the AIGP cost metric at step 708. At step 710, the method 700 may include determining additional information about the service PEP 113 and the service provider network 102 based on an advertisement of a network prefix of a customer of the service provider network 102. At step 712, the method 700 may include having the partner PE 166 transmit traffic intended for the customer to the service PEP 113 based on the shortest path to the service PEP 113 and the additional information about the service PEP 113 via the partner provider core router 160 and the service provider core router 116. At step 714, the method 700 may include having the service PEP 113 transmit the traffic to the customer via service PE 107.

In one embodiment, the system 100 and methods described herein may provide the PEPs 113, 122, 151, 169 with the ability to hide the ultimate next hops for a given path, which can provide for increased network reliability. As an example, as shown in FIG. 1, if service PE 107 advertises network prefix A/8 to service PE 195, which may be a New Jersey PE ("NJ-PE"), the service PE 195 may advertise the network prefix A/8 to the service PEP 113 by utilizing processor 196 and memory 197. The service PEP 113 may then advertise the network prefix A/8 to the partner network 150 with a label identifying the service PEP 113 as the next hop. The partner network 150 may begin forwarding traffic intended for the customer of the service provider network 102, such as via partner PE 166, based on the advertisement and label. However, if service PE 107 fails, neither partner PE 166 nor partner PE 157 need information relating to the failure of service PE 107. As a result, partner PE 166 and partner PE 157 do not need to reprogram each of their forwarding information bases (FIBs) in response to the failure of service PE 107. Instead, partner PE 166 can forward the traffic intended for the customer of the service provider network 102 to the service PEP 113. Since PE 107 has failed, the service PEP 113 can forward the traffic to the customer via service PE 195, which has not failed in this example. As a result, this optimizes the reliability of the service provider network 102 and reduced FIB reprogramming churn on the partner PEs 166, 157.

In one embodiment, the system 100 and methods described herein may include aligning a VPN identifier (VPNID) of the customer between the service provider network 102 and the partner network 150. Also, in one embodiment, the VPNID may be utilized to inform the Route Target Constrain across the networks 102, 150. In another embodiment, the service PEP 113 may only advertise paths or prefixes originating from the NE region and the service PEP 122 may only advertise paths or prefixes originating from the NW region by utilizing processor 123 and memory 124. In still another embodiment, the partner PEP 166 may only advertise paths or prefixes originating from the Rio de Janeiro region, and the partner PEP 151 may only advertise paths or prefixes originating from the region that the partner PEP 151 resides in. By ensuring that the corresponding PEP only advertises paths or prefixes originating from their given region, this can force the alignment of the region with the corresponding PEP in the given region. As an example of one approach, a route reflector-centric model may be utilized. In the route reflector-centric model, a PEP in the region of a particular route reflector may only accept paths or prefixes from the route reflector. As an example of another approach, a PE-centric model may be utilized. In the PE-centric model, the PEPs may only listen to PEs in the same region as the PEPs.

In one embodiment, there may be a minimum of two PEPs 113, 122, 151, 169 per network region or span of control. In one embodiment, the span of control may be determined by analyzing how sub-optimal a particular path is of a particular PE 157, 166 in a partner network 150 to a PEP 151, 169 that is local to the PE 157, 166 and vice versa. In another embodiment, additional PEPs 113, 122, 151, 169 and provider core routers 116, 119, 160, 172 may be deployed in a scalable fashion without affecting the existing exchange point infrastructure of the architecture. For example, exchange point locations may not be changed, but existing regions may be augmented by adding parallel connections and additional provider core routers. In yet another embodiment, the PEPs 113, 122, 151, 169 may be specialized leaf P-core elements that may be utilized in a traditional role, although a designer may be encouraged to consider the security aspects of dual purposing such elements, particularly when considering security (e.g. label spoofing, ACL management, etc.), network capacity, reliability, and other similar issues.

In one embodiment, the PEPs 113, 122, 151, 169 may agree upon a mapping of route targets in respective partner autonomous system domains, while accounting for possible additional topology requirements to support hub-and-spoke, B-VoIP, mobility, cloud computing, etc. In one embodiment, the PEPs 113, 122, 151, 169 may utilize a security scheme that minimizes exposure to attacks or misconfiguration in partner networks. For example, the PEPs 113, 122, 151, 169 may utilize access control lists to require only agreed upon labels to be transmitted between the service provider network 102 and the partner network 150. In one embodiment, the PEPs 113, 122, 151, 169 may provide mechanisms for label spoofing avoidance such that only labels that are advertised to a partner network will be accepted from a partner network. In one embodiment, the system 100 and methods described herein may further include utilizing any of the various components described in the system 100 to perform the operative functions disclosed herein.

It is important to note that the methods described above may incorporate any of the functionality, devices, and/or features of the system 100 and subsystems described above, or otherwise, and are not intended to be limited to the description or examples provided herein.

Figure 8:
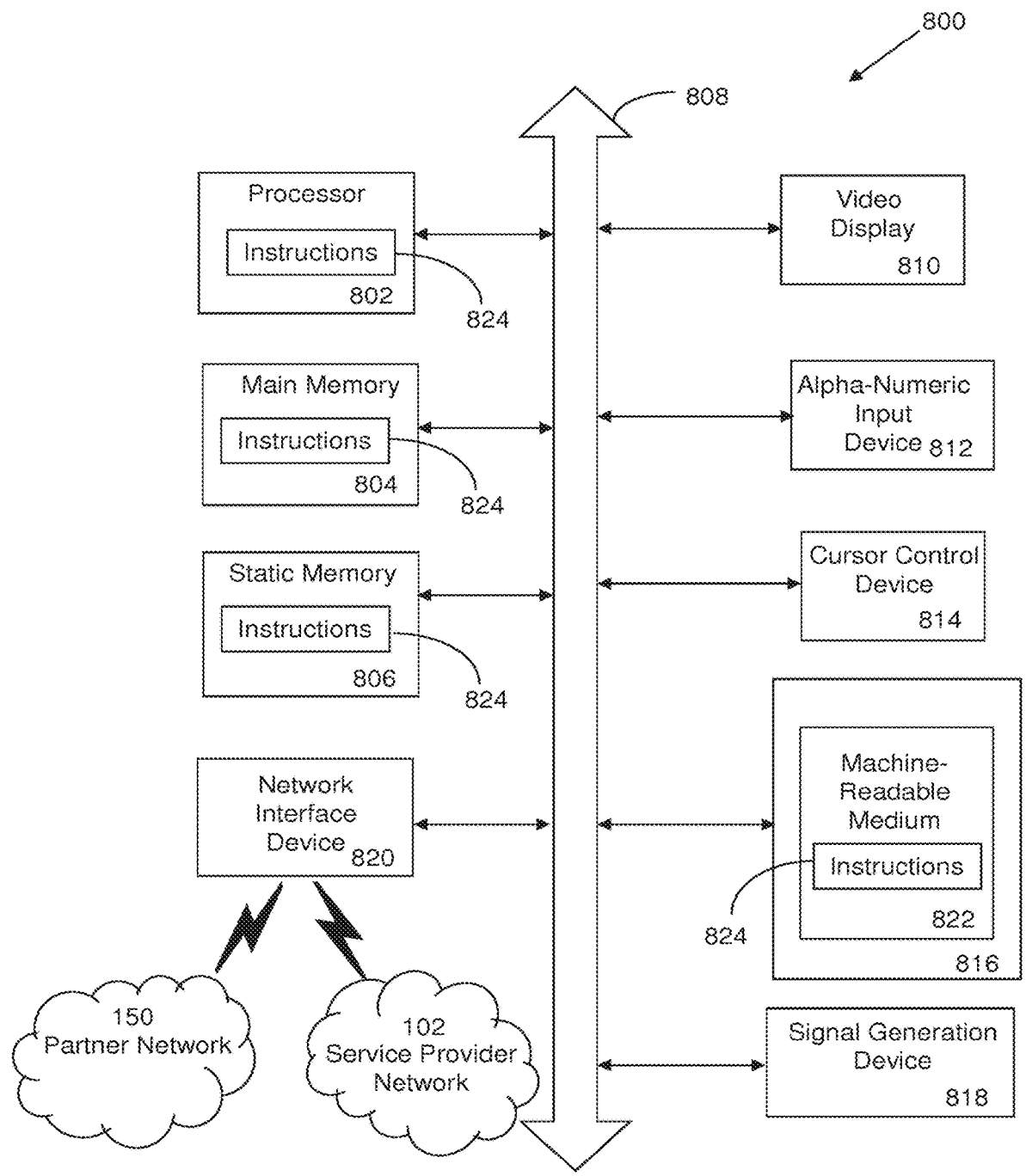
FIG. 8 is a schematic diagram of a machine in the form of a computer system within which a set of instructions, when executed, may cause the machine to perform any one or more of the methodologies of the inter-provider network architecture system.

Referring now also to FIG. 8, at least a portion of the methodologies and techniques described with respect to the exemplary embodiments of the inter-provider network architecture system 100 can incorporate a machine, such as, but not limited to, computer system 800, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine operates as a standalone device. In some embodiments, the machine may be connected (e.g., using a service provider network 102, partner network 150, or a combination thereof) to and assist with operations performed by other machines, such as, but not limited to, the server 140, the database 145, or any combination thereof. The machine may be connected with any component in the system 100. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 804, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions 824 (e.g., software) embodying any one or more of the methodologies or functions described herein, including those methods illustrated above. The instructions 824 may also reside, completely or at least partially, within the main memory 804, the static memory 806, or within the processor 802, or a combination thereof, during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 822 containing instructions 824 so that a device connected to the service provider network 102, partner network 150, or both, can send or receive voice, video or data, and to communicate over the service provider network 102, partner network 150, or both, using the instructions. The instructions 824 may further be transmitted or received over the service provider network 102, partner network 150, or both, via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system, comprising:
a service provider exchange point in a service provider network, the service provider exchange point having a processor, and a memory that stores computer-executable instructions that, when executed by the processor, cause the processor to perform operations comprising:
providing an advertisement of a network prefix for a device with a label to a partner provider exchange point in a partner network,
wherein the label is transmitted to the partner provider exchange point responsive to an access control list indicating that the label is agreed to by the service provider network and the partner network; and receiving traffic intended for the device based on the service provider exchange point being in a shortest path from a partner provider edge router in the partner network.

2. The system of claim 1, wherein the operations further comprise receiving the advertisement of the network prefix of the device, wherein the device is in communication a service provide edge router in the service provider network.

3. The system of claim 1, wherein the operations further comprise identifying, via the label, the service provider exchange point as a next hop.

4. The system of claim 1, wherein the operation of receiving the traffic further comprises receiving the traffic based on an advertisement of a loopback of the service provider exchange point and the advertisement of the network prefix with the label.

5. The system of claim 1, wherein the operations further comprise determining that the service provider exchange point is in the shortest path based on a cost metric, reachability information, or a combination thereof.

6. The system of claim 1, wherein the operations further comprise aligning a virtual private network identifier of the device between the service provider network and the partner network.

7. The system of claim 1, wherein the operations further comprise aligning a cost metric between the service provider network and the partner network.

8. The system of claim 1, wherein the operations further comprise facilitating the partner provider exchange point to hide an ultimate next hop for a path.

9. The system of claim 1, wherein the operations further comprise indicating, to a partner provider core router, that a next hop for the service provider exchange point is a service provider core router in the service provider network.

10. The system of claim 1, wherein the operations further comprise encapsulating the traffic with a service provider exchange point label that identifies the service provider exchanging point.

11. The system of claim 1, wherein the operations further comprise causing the service provider exchange point to only advertise paths or prefixes originating from a region of the service provider network.

12. The system of claim 1, wherein the operations further comprise causing the service provider exchange point to only accept paths or prefixes from a route reflector.

13. The system of claim 1, wherein the operations further comprise generating a mapping of route targets in respective partner autonomous system domains.

14. A method, comprising:
providing, by utilizing instructions from a memory that are executed by a processor, an advertisement of a network prefix for a device with a label to a partner provider exchange point in a partner network,
wherein the label is transmitted to the partner provider exchange point responsive to an access control list indicating that the label is agreed to by a service provider network and the partner network; and
receiving traffic intended for the device based on a service provider exchange point of the service provider network being in a shortest path from a partner provider edge router in the partner network.

15. The method of claim 14, further comprising providing a mechanism for label spoofing avoidance such that only labels that are advertised to the partner network are accepted from the partner network.

16. The method of claim 14, further comprising determining that the service provider exchange point is in the shortest path based on a cost metric, reachability information, or a combination thereof.

17. The method of claim 14, further comprising forwarding the traffic to a different service provider edge router in the service provider network if a service provider edge router experiences a failure, wherein a forwarding information base of the partner provider edge router does not need to be updated based on the failure.

18. The method of claim 14, further comprising encapsulating the traffic with a service provider exchange point label that identifies the service provider exchanging point.

19. The method of claim 18, further comprising swapping the service provider exchange point label with a service provider edge label that identifies a service provider edge router prior to forwarding the traffic to the service provider edge router in the service provider network.

20. A non-transitory computer-readable medium comprising instructions, which when executed by a processor, cause the processor to perform operations comprising:
providing an advertisement of a network prefix for a device with a label to a partner provider exchange point in a partner network,
wherein the label is transmitted to the partner provider exchange point responsive to an access control list indicating that the label is agreed to by a service provider network and the partner network; and
receiving traffic intended for the device based on a service provider exchange point of the service provider network being in a shortest path from a partner provider edge router in the partner network.

* * * * *